(12) United States Patent
Batni et al.

(10) Patent No.: US 7,961,862 B2
(45) Date of Patent: Jun. 14, 2011

(54) METHOD AND APPARATUS FOR PROVIDING RINGBACK IN A TELECOMMUNICATIONS NETWORK

(75) Inventors: Ramachendra P. Batni, Phoenix, AZ (US); Ranjan Sharma, New Albany, OH (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1522 days.

(21) Appl. No.: 11/352,801

(22) Filed: Feb. 13, 2006

(65) Prior Publication Data
US 2007/0201647 A1 Aug. 30, 2007

(51) Int. Cl.
*H04M 3/42* (2006.01)
(52) U.S. Cl. .............. 379/207.16; 379/196; 379/201.01; 379/221.08; 379/221.09
(58) Field of Classification Search .................. 379/196, 379/201.01, 207.16, 221.08, 221.09
See application file for complete search history.

(56) References Cited

U.S. PATENT DOCUMENTS

| | | |
|---|---|---|
| 2004/0120494 A1 | 6/2004 | Jiang et al. |
| 2005/0021713 A1* | 1/2005 | Dugan et al. .................. 709/223 |
| 2005/0078812 A1 | 4/2005 | Batni et al. |
| 2005/0105706 A1* | 5/2005 | Kokkinen ................ 379/201.01 |

FOREIGN PATENT DOCUMENTS

| | | |
|---|---|---|
| EP | 1 523 199 A1 | 4/2005 |
| WO | WO 98/21901 A | 5/1998 |

* cited by examiner

*Primary Examiner* — Quynh H Nguyen
(74) *Attorney, Agent, or Firm* — Fay Sharpe LLP

(57) ABSTRACT

A method of providing ringback in a telecommunications network (100) includes: receiving a call at a service switching point (114) for a called party (112) served by the service switching point (114), the call being from a calling party (122); encountering a trigger detection point (116) while engaging in a call setup for the call, the trigger detection point (116) being provisioned for the called party (112) at the service switching point (114); in response to encountering the trigger detection point (116), extending a first leg of the call to a service node (130) that provides ringback to the calling party (122); setting-up a second leg of the call between the service node (130) and the called party (112); bridging together the first and second legs of the call at the service switching point (114); and, removing the service node (130) from participation in the call after the first and second legs have been bridged together at the service switching point (114).

19 Claims, 2 Drawing Sheets

100

US 7,961,862 B2

METHOD AND APPARATUS FOR PROVIDING RINGBACK IN A TELECOMMUNICATIONS NETWORK

FIELD

The present inventive subject matter relates to the telecommunication arts. One particular application is found in conjunction with ETSI (European Telecommunications Standards Institute) wire-line networks, and the specification makes particular reference thereto. However, it is to be appreciated that aspects of the present inventive subject matter are also amenable to other like applications.

BACKGROUND

In telephony, ringback or a ringback signal is an audible tone or series of tones or an audible message or other like signal provided to a calling party's telephone or other device or end user terminal (EUT) to indicate that the called party's EUT is receiving a ringing signal or is otherwise being alerted. Traditionally, in wire-line networks such as those conforming to the ETSI standards, the ringback signal is generated and/or provided by a telecommunications switch within the PSTN (Public Switched Telephone Network). For example, the switch may be a class 5 telecommunications switch such as Lucent Technologies 5ESS or another like switch. The ringback signal is commonly provided by the switch serving the called party, and the ringback signal is the same for all calls.

More recently, customized ringback services have been introduced in telecommunications networks. Using such a service, a called party subscriber is able to choose which one of a plurality of different ringback signals are played or provided to a calling party based upon one or more determinate factors.

For example, with reference to FIG. 1, a calling party 10 being served by a switch or SSP (Service Switching Point) 12 places a call over the PSTN 20 to a called party 30 being served by a switch or SSP 32. Suitably, the customized ringback signals are generated and/or provided by a service node (SN) 34 operatively connected to the SSP 32, e.g., via trunks or other like transmission channels. Assuming the called party 30 subscribes to the customized ringback service, when the call placed by the calling party 10 makes its appearance at the SSP 32 (i.e., via the PSTN 30), the SSP 32 detects that special handling is to be provided by the SN 34. Accordingly, the SSP 32 extends the call to the SN 34 via one of the trunks (e.g., trunk 36). Traditionally, the SN 34 initiates a second leg of the call for the called party using a separate trunk (e.g., trunk 38), and in parallel, provides the subscriber selected ringback signal to the calling party 10. When the called party 30 answers the call, the SN 34 "bridges" or otherwise connects the two legs of the call together, as indicated by the hairpin or arrow 40.

As can be appreciated from the above example, call hairpinning at the SN 34 in the manner shown unduly ties-up various resources. For example, the two trunks 36 and 38 are both occupied for the duration of the call. Moreover, resources within the SN 34 (e.g., ports, conference circuits, etc.) also remain used for the entire duration of the call. Accordingly, it is desirable to circumvent or bypass call hair pinning and/or extricate the SN 34 from participation in the call after the called party 30 has answered the call. That is to say, it is desirable to have a "call drop back" feature or function, whereby once the called party 30 has answered the call, the two call legs are bridged at the SSP 32 rather that being hair-pinned in the SN 34, thereby allowing the SN 34 to be dropped out of the call.

In an Advanced Intelligent Network (AIN) such as the kind used in the North American Region, there have been developed standards and/or techniques to avoid call hair-pinning at the service node. For example, there are known Telcordia specification of TBCT (Two B Channel Transfer) and the Nortel-specific RLT (Release Link Trunk) approach. However, there have been heretofore no similar standards or approaches developed in or for ETSI networks that provide the desired call drop back functionality.

Accordingly, a new and improved method and/or system for providing a customized ringback service without hair pinning at the SN is disclosed that overcomes the above-referenced problems and others.

SUMMARY

In accordance with one embodiment, a method of providing ringback in a telecommunications network includes: receiving a call at a service switching point for a called party served by the service switching point, the call being from a calling party; encountering a trigger detection point while engaging in a call setup for the call, the trigger detection point being provisioned for the called party at the service switching point; in response to encountering the trigger detection point, extending a first leg of the call to a service node that provides ringback to the calling party; setting-up a second leg of the call between the service node and the called party; bridging together the first and second legs of the call at the service switching point; and, removing the service node from participation in the call after the first and second legs have been bridged together at the service switching point.

In accordance with another embodiment, a system is provided for supplying ringback in a telecommunications network. The system includes: means for receiving a call at a service switching point for a called party served by the service switching point, the call being from a calling party; means for encountering a trigger detection point while engaging in a call setup for the call, the trigger detection point being provisioned for the called party at the service switching point; in response to encountering the trigger detection point, means for extending a first leg of the call to a service node that provides ringback to the calling party; means for setting-up a second leg of the call between the service node and the called party; means for bridging together the first and second legs of the call at the service switching point; and, means for removing the service node from participation in the call after the first and second legs have been bridged together at the service switching point.

In accordance with yet another embodiment, a system for providing a customized ringback service in a telecommunications network includes: a service switching point operatively connected to an end user terminal of a called party served by the service switching point, the called party being provisioned with a trigger detection point at the service switching point; and, a service node operatively connected to the service switching point, the service node providing the customized ringback service, whereby a particular ringback is selected from a plurality of different ringbacks and provided to a calling party. When a call from a calling party arrives at the service switching point for the called party, the service switching point sets-up the call in accordance with a terminating basic call state model, such that during the call setup the trigger detection point is encountered, whereupon the service switching point extends a first leg of the call to the service node.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION

For clarity and simplicity, the present specification shall refer to structural and/or functional elements, entities and/or facilities, relevant communication standards, protocols and/or services, and other components and features that are commonly known in the art without further detailed explanation as to their configuration or operation except to the extent they have been modified or altered in accordance with and/or to accommodate the embodiment(s) presented herein.

Figure 1:
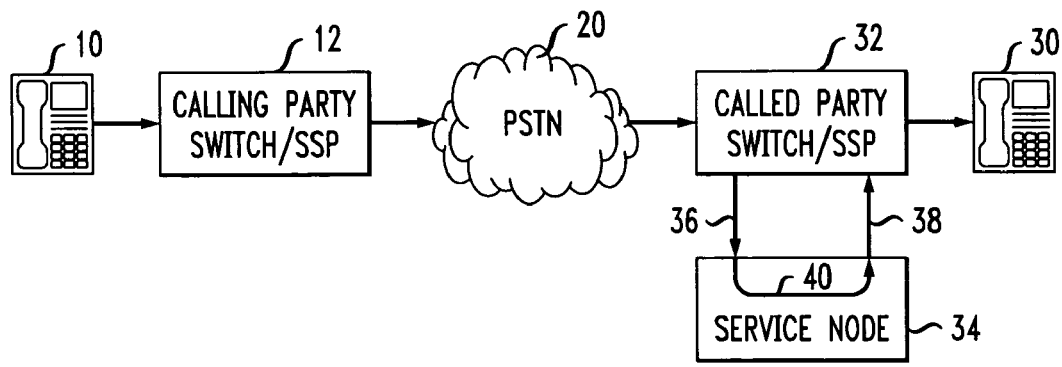
FIG. 1 is a diagrammatic illustration showing a prior art approach for providing a customized ringback service with call hair pinning at a service node.
Figure 2:
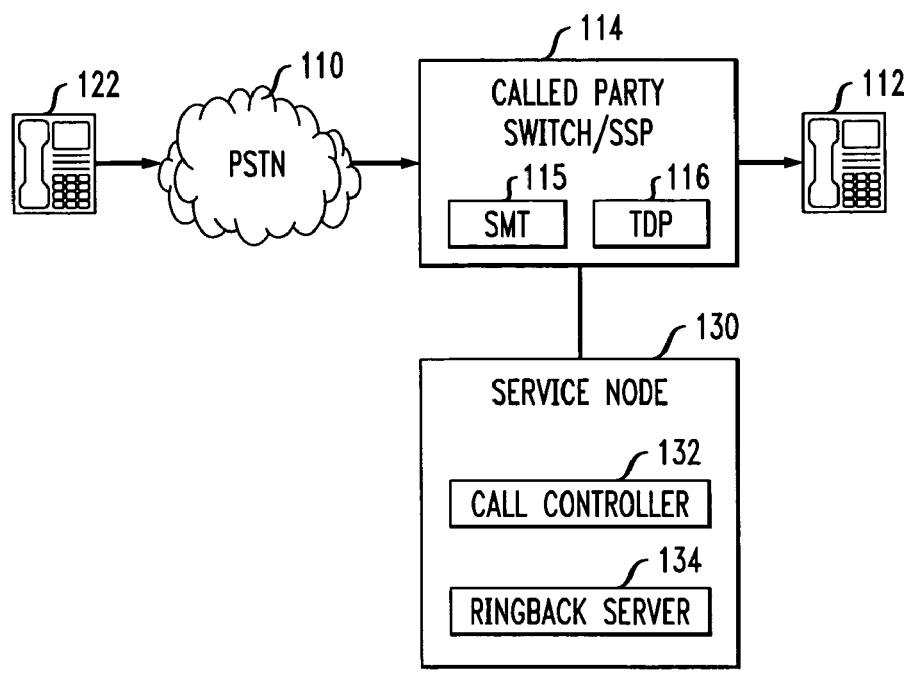
FIG. 2 is a diagrammatic illustration of an exemplary telecommunications network suitable for practicing aspects of the present inventive subject matter.

With reference to FIG. 2, there is shown an exemplary wire-line or landline telecommunications network 100 that includes, in the usual manner, a PSTN 110. Suitably, the network 100 is an ETSI network or other like network, e.g., employing similar standards and/or protocols. For purposes of the present example, a called party employs an EUT 112 (e.g., a telephone or other like end user device or instrument or customer premises equipment (CPE)) to receive calls via the PSTN 110. As shown, the EUT 112 is, in the usual manner, operatively connected to and/or served by a telecommunication switch or SSP 114 that is in turn operatively connected to the PSTN 110 in the usual manner. For example, the SSP 114 is optionally implemented as an end office (EO) or other like facility including a class 5 switch or another suitable telecommunications switch.

Another EUT 122 (e.g., also a telephone or other like end user device or instrument or CPE) is used by a calling party in the usual manner to access the PSTN 110 and/or to call the called party. In the illustrated example, the EUT 122 is wire-line device operatively connected to and/or served by another telecommunication switch or SSP (not shown) that is in turn operatively connected to the PSTN 110 in the usual manner. Alternately, the EUT 112 is a wire-line device operatively connected to and/or served by the same SSP 114 that serves the EUT 112. In yet another variation, the calling party EUT 122 is a wireless device (e.g., a mobile telephone or the like) that accesses the PSTN 110 and/or the called-party serving SSP 114 via a suitable wireless network (not shown).

For purposes of the present example, the EUT 112 shall correspond to and/or be referred to as the called party and the EUT 122 shall correspond to and/or be referred to as the calling party. That is to say, in the present example, it shall be assumed that the calling party employs the EUT 122 to place a call over the network 110 to the called party employing the EUT 112. While only a single calling party, a single called party and a single SSP are shown in the present example for purposes of simplicity and clarity, in practice, it is to be appreciated that a plurality of calling parties and/or a plurality of called parties are likely to be similarly situated and/or served by a plurality of various similar SSPs arranged throughout the network. Additionally, for purposes of simplicity and clarity herein, the illustrated example shows the SSP 114 serving only one user or party (namely, the called party 112). However, it is to be appreciated that in practice the SSP 114 is likely to serve a plurality of similarly situated users or parties.

As illustrated, a service node (SN) 130 is operatively connected to the SSP 114 in the usual manner, e.g., via a plurality of signaling and/or bearer links or channels. Suitably, the SN 130 provides a customized ringback service for subscribing parties served by the SSP 114. For purposes of the present example, it shall be assumed that the called party 112 is in fact a subscriber to the customized ringback service. Again, for purposes of simplicity and clarity herein, the illustrated example shows the SSP 114 serving only one subscriber (namely, the party 112). However, it is to be appreciated that in practice the SSP 114 is likely to serve a plurality of similarly situated subscribers.

As shown, the SN 130 includes a call control component and/or function 132 (nominally referred to herein as the call controller) and a ringback generation and/or providing component 134 (nominally referred to herein as the ringback server). Optionally, the switch for the SSP 114 and the SN 130 are supported on the same hardware platform, or alternately, on separate platforms. Similarly, the call controller 132 and the ringback server 134 are optionally supported on the same hardware platform, or alternately, on separate platforms, such as a Service Control Point (SCP) and an Intelligent Peripheral (IP) respectively.

Suitably, as those of ordinary skill in the art will appreciate, operation of the SSP 114 is carried out based on a call model. Generally, the call model is a finite state machine used in the SSP 114 that accurately and concisely reflects the current state of a call at any given point in time, e.g., as specified by the ETSI. The call model is made up of states or PICs (Points-In-Call) and transitions therebetween. In the present example, the SSP 114 is suitably provisioned to function in accordance with a Basic Call State Model (BCSM) or other like model. Since the customized ringback service is invoked on the terminating side of the BCSM, the terminating model of the BCSM, i.e., the TBCSM, is applicable to such calls.

Suitably, inter-state transitions involve passing through elements commonly referred to as Detection Points (DPs). While operating in accordance with the TBCSM, DPs are identified which are encountered during the call setup in which the SSP 114 is engaged. The identified DPs optionally include one or more triggers which have firing criteria associated therewith. When a trigger is armed (i.e., made active), and its associated firing criteria are satisfied, it fires. For example, when a trigger fires, a message is formatted with call state information and transmitted by the SSP 114 to the SN 130. Suitably, the SN 130 then reads this call related data and generates a response that the SSP 114 uses in further call processing.

Generally, a TDP (Trigger Detection Point) refers to a DP that is provisioned with a statically and/or manually armed trigger, e.g., armed via a suitable service management tool (SMT) 115 or the like. That is to say, a DP is made or turned into a TDP by arming a trigger associated with the DP. Optionally, different TDPs are classified as "Request" or "Notification" TDPs. Thus, during a call setup, either TDP-R's and/or TDP-N's may be encountered by the SSP 114. If an "-R" or "Request" type of TDP is encountered, then the SSP 114 suspends call processing when communication with the SN 130 is initiated. Suitably, call processing by the SSP 114 resumes when a response is received from the SN 130. Alternately, if an "-N" or "Notification" type of TDP is encountered, then the SSP 114 continues with call processing when the trigger fires, e.g., after it sends out the message to the SN 130 notifying the SN 130 that a certain event has occurred. Additionally, the TDPs encounter by the SSP 114 in the TBCSM may also be unconditional or conditional TDPs. Suitably, unconditional TDPs, e.g., invoke access to the SN 130 regardless of the call status or call data at that moment, while conditional TDPs, e.g., have additional criteria to be fulfilled before accessing of the SN 130 is performed.

Suitably, when a call (e.g., from the calling party 122) appears for the called party 112 at the SSP 114, the SSP 114 recognizes that the called party 112 has a TDP-R active and accesses the SN 130. That is to say, e.g., when a party served by the SSP 114 (e.g., such as the party 112) subscribes to the customized ringback service provided by the SN 30, the subscriber is provisioned with a TDP 116 at the SSP 114, e.g., via the SMT 115. For example, a Terminating Attempt Authorized (TAA) DP or DP-12 or other like DP has its trigger statically and/or manually armed for the subscriber 112. Optionally, the TDP 116 is an unconditional TDP-R.

As the terminating or called-party serving entity, when a call appears at the SSP 114 for a called party served by the SSP 114, the SSP 114 engages in a call setup in accordance with the TBCSM. As the PICs and/or states of the TBCSM are advanced through one after the other, eventually a DP is reached and/or identified indicating that the SSP 114 is authorized to attempt termination of the call to the called party. This DP is commonly referred to and/or known as a TAA DP, or alternately, DP-12 in an ETSI network. Normally, at this point, the SSP 114 responds by attempting to terminate the call to the called party. However, in the present example, the subscriber 112 has been provisioned with the TDP 116 at the SSP 114. That is to say, the TAA DP or DP-12 has had an associated trigger armed for the subscriber 112, hence becoming the TDP 116. Suitably, the TDP 116 is optionally an unconditional TDP-R. Accordingly, when the TDP 116 is encountered during the otherwise normal call setup cycle, the SSP 114 does not in fact attempt to terminate the call to the called party 112. Rather, the SSP 114 formats a message referred to as an initial DP (IDP), and transmits the same to the SN 130. Meanwhile, the SSP 114 also suspends further call processing until it receives a response from the SN 130.

Suitably, the call controller 132 on the SN 130 processes the IDP message and responds with instructions to the SSP 114 to extend the call to the ringback server 134, whose identification is provided to the SSP 114 by the SN 130 as part of the response to the IDP. In general, SSP 114 complies with the instructions and extends a first leg of the call (i.e., the leg originating with calling party 112) to the ringback server 134, which in turn chooses, from a plurality of different ringback signals, a particular ringback to provide to the calling party 122. Suitably, the ringback server 134 also initiates the setting up of a second call leg for the original called party 112. The second leg of the call (i.e., the leg terminating with the called party 112) is setup through the SSP 114, and the chosen ringback signal is returned from the SN 130 via the first leg of the call to the calling party 122. At this point, two different trunks or transmission links or channels are established and/or being used between the SSP 114 and the SN 130 to support the call. For example, the first (or originating) leg of the call extends between the SN 130 and the calling party 122 via a first trunk or transmission link or channel operatively connecting and/or established between SN 130 and the SSP 114, and the second (or terminating) leg of the call extends between the SN 130 and the called party 122 via a second trunk or transmission link or channel operatively connecting and/or established between SN 130 and the SSP 114. However, once the called party 122 answers the call, a call drop back function is initiated whereby the first and second legs of the call are requested by the SN 130 to be bridged or otherwise connected to one another at the SSP 114, and the trunks or transmission links or channels between the SSP 114 and the SN 130 are released and/or torn-down. Accordingly, at this point, the SN 130 has been extricated from further participation in the call.

Figure 3:
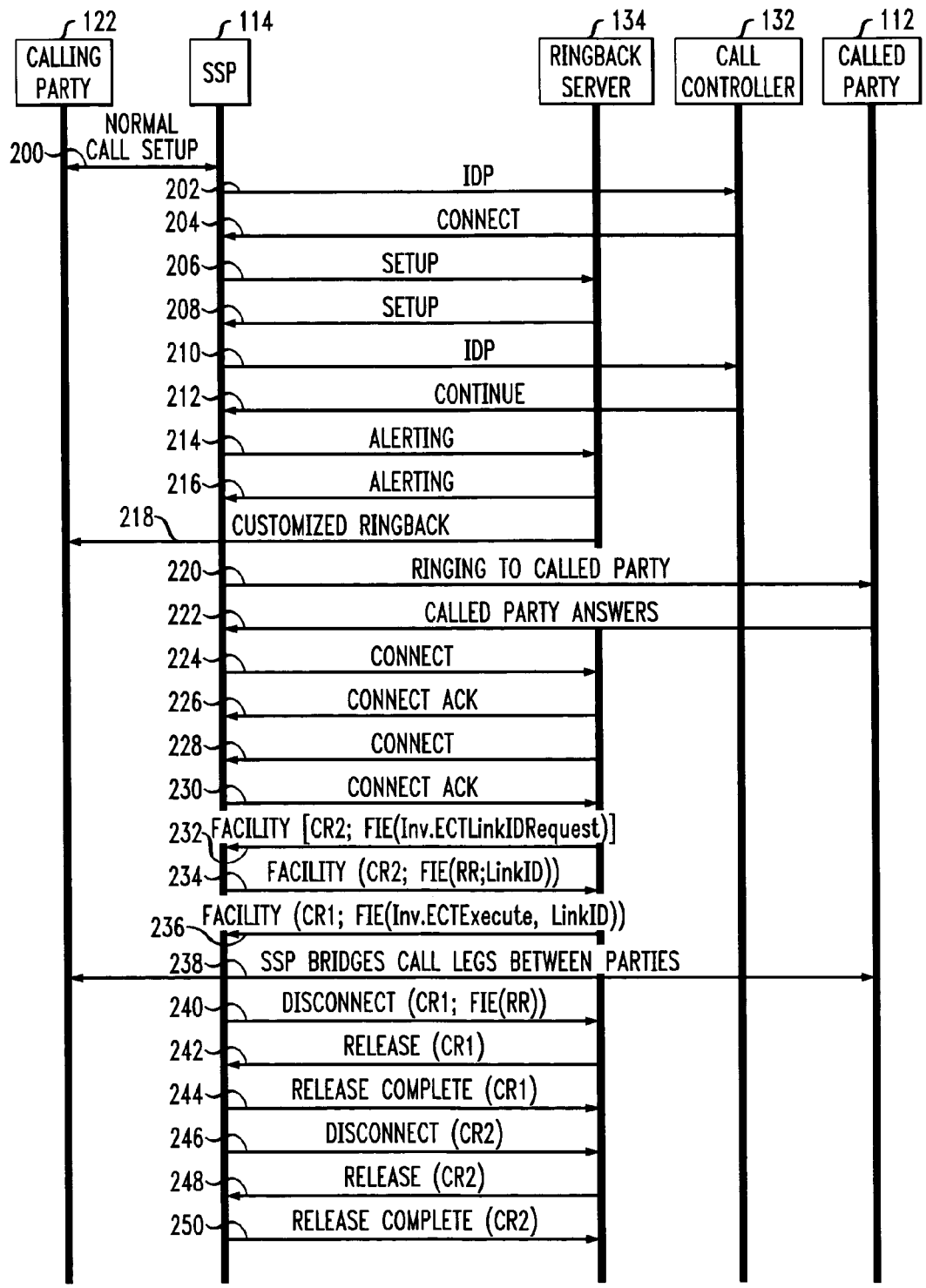
FIG. 3 is a message/call flow diagram illustrating an exemplary approach for providing a customized ringback service, which embodies aspects of the present inventive subject matter.

More specifically, with reference to FIG. 3, there is illustrated a message and/or call flow diagram showing an exemplary series of messages, signals, commands, responses and/or other communications exchanged between various network elements and/or entities (i.e., the calling party 122, the SSP 114, the ringback server 134, the call controller 132, and the called party 112) which is suitable for practicing one or more aspects of the present inventive subject. In FIG. 3, each step or element or exchanged communication in the message/call flow is identified by a corresponding reference numeral listed along the left-hand side of the figure. Furthermore, the messages identified by their names are defined in the ETSI standards and suitably comply with the same.

At step 200, the calling party 122 initiates a call to the called party 122, e.g., by dialing the called party's telephone number. Suitably, at this point, the usual call setup signaling and/or messages are exchanged between the calling party 122 and the SSP 114. In the present example, however, the called party 122 is a subscriber to the customized ringback service provided by the SN 130, and accordingly, is provisioned with the TDP 116 at the SSP 114. Suitably, the call controller 132 has also been previously provisioned at the SSP 114 as the entity or element that is to be provided call control when the TDP 116 is encountered. Therefore, at step 202, the appearance of the call for the subscriber 122 at the SSP 114 causes the TDP 116 to be encountered, and a corresponding IDP or other like message is sent from the SSP 114 to the call controller 132 of the SN 130. The IDP message includes call data such as the calling party's identity or telephone number, the called party's identity or telephone number and/or any other relevant call status data or call information. Suitably, the TDP 116 is a TDP-R, and call processing at the SSP 114 is suspended until a response and/or further instructions are received by the SSP 114 from the call controller 132.

Suitably, the call controller 132 recognizes the call is meant for a subscriber of the customized ringback service (e.g., by recognizing the called party's identity or telephone number in the IDP received in step 202), and that a customized ringback is warranted in this instance. Therefore, at step 204, the call controller 132 issues a CONNECT or other like message or command to the SSP 114, instructing the latter to extend the call to a specific entity, component and/or platform whose address is provided in the message. More specifically, the connect message of step 204 identifies and/or references the address of the ringback server 134. In turn, the component or platform 134, nominally termed the ringback server to distinguish it from the call controller 132, provides the customized or specialized ringback for this call. Of course, as previously noted, the functions of the call controller 132 and the ringback server 134 are optionally performed on the same physical platform.

In response to receiving the connect message in step 204, at step 206, the SSP 114 issues a SETUP or other like message to the address identified and/or referenced in the recently received connect message, i.e., to the ringback server 134. At this point, the ringback server 134 determines which one of a plurality of different customized or specialized ringback signals is to be played or otherwise provided to the calling party 122. For example, using logic and/or algorithms provisioned in the SN 130 and/or the ringback server 134, the chosen ringback is selected based upon one or more determinate factors. For example, the determinate factors are optionally, the identity of the calling party, the time, day and or date of the call, etc. Based upon the status or state of the determinate factors, the subscriber 122 sets as desired which one or more ringback signals are to be played and/or provided to the calling party 122. More specifically, e.g., the subscriber may select a ringback like the song "happy birthday" to be provided to the calling party 122 if the call in question is received on the calling party's birthday. Alternately, a subscriber may select a ringback that plays a customized message or a specific song to a calling party based upon the calling party's particular identity. Suitably, the subscriber 112 has a wide variety of different ringback signals to chose from and/or optionally they may create their own personalized ringback. Suitably, for a particular combination of determinate factors, the subscriber 112 optionally assigns one or more ringback signals to be chosen for playback to the calling party 122. In an exemplary embodiment, the actual states of the determinate factors for any given call are suitably obtained from the relevant call data and/or information contained in the setup message received in step 206. For example, the setup massage of step 206 includes the identity and/or telephone number of the calling party 122, the identity and/or telephone number of the called party 112, date and/or time stamp information, etc.

In parallel to choosing a ringback to be provided for this call, at step 208, the ringback server 134 initiates the setup for the second leg of the call to the original called party, i.e., the subscriber 112. That is to say, the ringback server 134 issues a SETUP or other like message to the SSP 114. Suitably, the setup message of step 208 is similar to the setup message of step 206. This time, however, the redirecting party information in the SETUP message indicates that the call is being redirected from the ringback server 134, and the called party information remains set to the original called party 112. The original calling party remains unchanged to ensure that any called party active supplementary service, like caller ID display or similar service, remains unaffected by the inclusion of SN 130 and/or ringback server 134 in the call instance.

Since the called party 112 has been provisioned with the TDP 116 at the SSP 114, in response to the setup message of step 208, the SSP 114 issues a second IDP message at step 210 to the call controller 132 when the TDP 116 is again encountered during the call setup carried out by the SSP 114 to the SETUP request from the SN 130 in accordance with the TBCSM employed by the SSP 114. Suitably, the second IDP identifies the tone server 134 as the redirecting party based on the values received in the SETUP message 208. At step 212, the call controller 132 detects or recognizes that the call has been initiated by the tone server 134 (e.g., from redirecting party information contained in the IDP of step 210), and in response, instructs the SSP 114 to simply continue processing the call, e.g., via a CONTINUE or other like message issued by the call controller 132 to the SSP 114.

Having received the CONTINUE message in step 212, the SSP 114 rings the original called party 112 and informs the ringback server 134 that the called party 112 is being alerted (or rung) via an ALERTING or other like message issued from the SSP 114 to the ringback server 134 in step 214. Suitably, the alerting message of step 214 is sent on the second or called party leg of the call to the ringback server 134. In turn, the ringback server 134 reflects the alerting message on the first or calling party leg of the call at step 216. Suitably, the reflected alerting message cuts trough the bearer or voice path of the call. At step 218, the customized or specialized ringback signal previously selected is played on the calling party leg, i.e., the customized ringback is provided by the ringback server 134 to the calling party 122.

Meanwhile, at step 220, the SSP 114 provides ringing to the called party 112, e.g., such that the original called party's telephone or other EUT rings. At step 222, it is shown that the called party 112 answers the call. That is to say, an off-hook or other like signal indicating the answering of the call is sent from the called party 112 to the SSP 114. Accordingly, the SSP 114 detects the called party answer and cuts through the call path to the ringback server 134 by sending, in step 224, a CONNECT or other like message to the ringback server 134 for the called party leg. Suitably, at step 226, the ringback server 134 acknowledges the connect message of step 224 with a CONNECT ACK or other like acknowledgement message returned from the ringback server 134 to the SSP 114.

At step 228, the ringback server 134 recognizes the connect message of step 224 and removes the ringback signal from the calling party leg of the call, i.e., the first leg of the call. The ringback server 134 also sends a CONNECT or other like message to the SSP 114 on the calling party leg of the call to complete the cut-thru of that leg in both directions (from and to the calling party). In response, at step 230, the SSP 114 cuts through the forward call path from the calling party, and sends a CONNECT ACK or other like acknowledgement message back to the ringback server 134. At this point, the ringback server 134 is in the voice or bearer path for both legs of the call, i.e., the first or calling party leg of the call and the second or called party leg or the call. Suitably, the ringback server 134 stands ready at this point to perform call-bridging therethrough in case the call drop back feature fails.

At step 232, the ringback server 134 declares its intent to initiate call drop-back and obtains the identity of or reference to the primitive used by the SSP 114 to identify the operation. For example, the ringback server 134 issues a FACILITY or other like message to the SSP 114, with the Facility Information Element (FIE) containing an invoke operation (Inv) to get or request a reference to a LinkID for Explicit Call Transfer (ECT). Suitably, the FACILITY message also includes a reference to the second call leg (i.e., the leg of the call between the ringback server 134 and the original called party 112). In the present example, CR2 serves as the aforementioned reference to the second call leg. At step 234, the SSP 114 returns a response to the ringback server 134 containing the requested LinkID. For example, the response is optionally another FACILITY message containing the LinkID in the FIE.

At step 236, the ringback server 134 directs the SSP 114 to bridge or otherwise connect the two call legs with one another. For example, the ringback server 134 issues yet another FACILITY message with the FIE set to invoke an execution of ECT. Suitably, the facility message uses the LinkID previously obtained by the ringback server 134 and provides a reference to the other call leg (CR1) so that the SSP 114 knows which two call legs are to be bridged at the SSP 114. In the present example, CR1 serves as the reference to the first call leg, i.e., the leg of the call between the ringback server 134 and the calling party 122. At step 238, the SSP 114 bridges or otherwise connects the two call legs with one another in accordance with the facility message received in step 236. Having successfully bridged the two call legs at the SSP 114, the parties 112 and 122 are now free to engage in conversation or otherwise communicate as they see fit.

Suitably, at this point, the process begins for extricating the SN 130 from further participation in the call. For example, at step 240, the SSP 114 initiates the call tear down for the call leg reference that was used in the ECT invoked using the facility message of step 236, i.e., the tear down of the call leg referenced by CR1 or the first or calling party leg of the call between the SSP 114 and the ringback server 134.

More specifically, for the first call leg, the SSP 114 issues at step 240 a DISCONNECT or other like message to the ringback server 134. In response, at step 242, the ringback server 134 sends a RELEASE or other like message to the SSP 114 instructing the SSP 114 to release the corresponding trunk, transmission link and/or channel between the SSP 114 and the ringback server 134. At step 224, the SSP 114 performs the release as instructed and returns a RELEASE COMPLETE or other like message to the ringback server 134 to notify the ringback server 134 of the successful release. Similarly, for the second call leg, the SSP 114 issues at step 246 a DISCONNECT or other like message to the ringback server 134. In response, at step 248, the ringback server 134 sends a RELEASE or other like message to the SSP 114 instructing the SSP 114 to release the corresponding trunk, transmission link and/or channel between the SSP 114 and the ringback server 134. At step 250, the SSP 114 performs the release as instructed and returns a RELEASE COMPLETE or other like message to the ringback server 134 to notify the ringback server 134 of the successful release. At this point, the SN 130 has been extricated from further participation in the call.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

It is also to be appreciated that the call flow depicted in FIG. 3 may be suitably altered while still incorporating aspects of the present inventive subject matter; the alternate embodiments thereby realizing the respective advantages of the aspects incorporated therein. For example, the functions of cut through to the calling party on the calling party leg and providing specialized ringback signal to the calling party, shown in steps 216 and 218 of FIG. 3, may occur immediately upon receipt of the SETUP message from the SSP 114, i.e., immediately following step 206. This embodiment has the advantage that the calling party will start hearing the specialized ringback signal earlier than if the service is implemented as shown in FIG. 3; however, if the called party is busy then the calling party will subsequently hear a busy signal following the special ringback signal which may cause the calling party confusion. Such a confusion is avoided in the call flow depicted in FIG. 3, by holding back providing the specialized ringback signal until step 218. In case a busy indication is received in the ALERTING message of 214, the busy is reflected back in step 216 and the rest of the FIG. 3 call flow is skipped. In any event, all such variations of the call flow that can be appreciated by those of ordinary skill in the art are contemplated as alternate embodiments.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of providing ringback in a wire-line telecommunications network, said method comprising:
   (a) receiving a call at a service switching point for a called party served by the service switching point, said call being from a calling party;
   (b) encountering a trigger detection point while engaging in a call setup for the call, said trigger detection point being provisioned for the called party at the service switching point;
   (c) in response to encountering the trigger detection point, extending a first leg of the call to a service node that provides ringback to the calling party, wherein the first leg of the call is extended to the service node from the service switching point via a first communication link therebetween;
   (d) setting-up a second leg of the call between the service node and the called party, wherein the second leg of the call is setup over a second communication link between the service node and the service switching point, said second link being different from the first link;
   (e) bridging together the first and second legs of the call at the service switching point, wherein the bridging is based at least in part on a FACILITY message; and,
   (f) removing the service node from participation in the call after the first and second legs have been bridged together at the service switching point, wherein the removing is performed by the service switching point.

2. The method of claim 1, further comprising:
   selecting a particular ringback from a plurality of different ringbacks based upon one or more determinate factors; and,
   providing the selected ringback to the calling party.

3. The method of claim 2, wherein the one or more determinate factors includes at least one of an identity of the calling party, a time of the call, a date of the call and a day of the call.

4. The method of claim 1, wherein the telecommunications network is a European Telecommunications Standards Institute wire-line network.

5. The method of claim 1, wherein the first leg of the call is extended to the service node from the service switching point via a first communication link therebetween, and the second leg of the call is setup over a second communication link between the service node and the service switching point, said second link being different from the first link.

6. The method of claim 5, wherein step (f) comprises:
   sending a first disconnect message from the service switching point to the service node;
   in response to the first disconnect message, sending a first release message from the service node to the service switching point, said first release message instructing the service switching point to release the first link; and,
   sending a first response to the first release message from the service switching point to the service node to notify the service node when the release of the first link is completed.

7. The method of claim 6, wherein step (f) further comprises:
   sending a second disconnect message from the service switching point to the service node;
   in response to the second disconnect message, sending a second release message from the service node to the service switching point, said second release message instructing the service switching point to release the second link; and,
   sending a second response to the second release message from the service switching point to the service node to notify the service node when the release of the second link is completed.

8. The method of claim 1, wherein step (e) comprises:
   sending a first message from the service node to the service switching point, said first message invoking an operation in the service switching point to establish a link identity for an explicit call transfer, said first message including a reference to the second call leg, such that the obtained link identity is associated therewith;
   responding to the first message with a second message sent from the service switching point to the service, said second message including the established link identity; and,
   sending a third message from the service node to the service switching point, said third message invoking execution of the explicit call transfer to the link identity included in the second message, said third message also referencing the first leg of the call so that the first leg of the call is transferred to the link identity via the executed explicit call transfer.

9. The method of claim 1, wherein encountering the trigger detection point in step (b) suspends further call processing by the service switching point until further instructions are received from the service node.

10. A system for providing ringback in a wire-line telecommunications network, said system comprising:
    means for receiving a call at a service switching point for a called party served by the service switching point, said call being from a calling party;
    means for encountering a trigger detection point while engaging in a call setup for the call, said trigger detection point being provisioned for the called party at the service switching point;
    in response to encountering the trigger detection point, means for extending a first leg of the call to a service node that provides ringback to the calling party, wherein the first leg of the call is extended to the service node from the service switching point via a first communication link therebetween;
    means for setting-up a second leg of the call between the service node and the called party, wherein the second leg of the call is setup over a second communication link between the service node and the service switching point, said second link being different from the first link;
    means for bridging together the first and second legs of the call at the service switching point, wherein the means for bridging receives a FACILITY message; and,
    means for removing the service node from participation in the call after the first and second legs have been bridged together at the service switching point, wherein the means for removing comprises the service switching point.

11. The system of claim 10, further comprising:
    means for selecting a particular ringback from a plurality of different ringbacks based upon one or more determinate factors; and,
    means for providing the selected ringback to the calling party.

12. The system of claim 11, wherein the one or more determinate factors includes at least one of an identity of the calling party, a time of the call, a date of the call and a day of the call.

13. The system of claim 10, wherein the telecommunications network is a European Telecommunications Standards Institute wire-line network.

14. The system of claim 10, wherein the first leg of the call is extended to the service node from the service switching point via a first communication link therebetween, and the second leg of the call is setup over a second communication link between the service node and the service switching point, said second link being different from the first link.

15. A system for providing a customized ringback service in a wire-line telecommunications network, said system comprising:
    a service switching point operatively connected to an end user terminal of a called party served by the service switching point, said called party being provisioned with a trigger detection point at the service switching point; and,
    a service node operatively connected to the service switching point, said service node providing the customized ringback service, whereby a particular ringback is selected from a plurality of different ringbacks and provided to a calling party;
    wherein when a call from a calling party arrives at the service switching point for the called party, the service switching point sets-up the call in accordance with a terminating basic call state model, such that during said call setup the trigger detection point is encountered, whereupon said service switching point extends a first leg of the call to the service node and a second leg of the call between the service node and the call party, wherein the first leg of the call is extended to the service node from the service switching point via a first communication link therebetween, and the second leg of the call is setup over a second communication link between the service node and the service switching point, said second link being different from the first link, and wherein the service switching point is operative to bridge together the first leg of the call with the second leg of the call based at least in part on a FACILITY message and remove the service node from participation in the call after the first and second legs have been bridge together at the service switching point.

16. The system of claim 15, wherein when the first leg of the call is extended to the service node a second leg of the call is setup between the service node and the called party, said service node thereafter directing the service switching point to bridging together the first and second legs of the call at the service switching point such that the service node is free to be removed from further participation the call.

17. The system of claim 15, wherein the telecommunications network is a European Telecommunications Standards Institute wire-line network.

18. A method of providing a service in a wire-line telecommunications network, said method comprising:
   (a) receiving a call for a called party at a service switching point, said call being from a calling party;
   (b) encountering a trigger detection point while engaging in a call setup for the call, said trigger detection point being provisioned at the service switching point;
   (c) in response to encountering the trigger detection point, extending a first leg of the call to a service node that provides the service, wherein the first leg of the call is extended to the service node from the service switching point via a first communication link therebetween;
   (d) setting-up a second leg of the call between the service node and the called party, wherein the second leg of the call is setup over a second communication link between the service node and the service switching point, said second link being different from the first link;
   (e) bridging together the first and second legs of the call at the service switching point, wherein the bridging is based at least in part on a FACILITY message; and,
   (f) removing the service node from participation in the call after the first and second legs have been bridged together at the service switching point, wherein the removing is performed by the service switching point.

19. The method of claim 18, wherein the telecommunications network is a European Telecommunications Standards Institute wire-line network.

* * * * *